United States Patent
Vulkan (10) Patent No.: US 10,086,690 B2
(45) Date of Patent: Oct. 2, 2018

(54) DRAINING ARRANGEMENT

(71) Applicant: RAVAL A.C.S. LTD., Beer-Sheva (IL)

(72) Inventor: Omer Vulkan, D.N. Hanegev (IL)

(73) Assignee: RAVAL A.C.S. LTD., Beer-Sheva (IL)

( * ) Notice: Subject to any disclaimer, the term of this patent is extended or adjusted under 35 U.S.C. 154(b) by 0 days.

(21) Appl. No.: 15/516,252

(22) PCT Filed: Sep. 17, 2015

(86) PCT No.: PCT/IL2015/050942
§ 371 (c)(1),
(2) Date: Mar. 31, 2017

(87) PCT Pub. No.: WO2016/051401
PCT Pub. Date: Apr. 7, 2016

(65) Prior Publication Data
US 2017/0253115 A1      Sep. 7, 2017

Related U.S. Application Data (60) Provisional application No. 62/056,682, filed on Sep. 29, 2014.

(51) Int. Cl.
*B60K 15/035*     (2006.01)
*B60K 15/03*      (2006.01)

(52) U.S. Cl.
CPC .. *B60K 15/03504* (2013.01); *B60K 15/03519* (2013.01); *B60K 2015/03467* (2013.01);
(Continued)

(58) Field of Classification Search
CPC ........ B60K 15/03504; B60K 15/03519; Y10T 137/613
See application file for complete search history.

(56) References Cited

U.S. PATENT DOCUMENTS 2,274,276 A    2/1942  Rappl
4,676,281 A    6/1987  Nord
(Continued)

FOREIGN PATENT DOCUMENTS

EP    1325829    7/2003
GB     851504   10/1960
(Continued)

OTHER PUBLICATIONS

International Search Report and Written Opinion from International Application No. PCT/IL2015/050942 dated Jan. 5, 2016.

*Primary Examiner* — Craig Schneider
*Assistant Examiner* — Kevin Barss
(74) *Attorney, Agent, or Firm* — Dorsey & Whitney LLP (57) ABSTRACT

A draining arrangement comprising a pipe segment (12) having an aperture (14) defined by circumferential wall portion (16) and a draining tube (20) having an insertion end (22) configured to be introduced into said aperture and to engage said circumferential wall portion such that the circumferential wall portion is slightly bent inwardly, thereby sealingly engaging the insertion end, the insertion end includes a bore (24) providing fluid communication between the pipe segment and the draining tube, and a cutaway (25) configured to allow fluid from the pipe segment to enter the bore.

24 Claims, 7 Drawing Sheets

(52) U.S. Cl.
CPC .............. *B60K 2015/03509* (2013.01); *B60K 2015/03542* (2013.01); *Y10T 137/613* (2015.04)

(56) References Cited

U.S. PATENT DOCUMENTS

| | | | |
|---|---|---|---|
| 4,852,761 A * | 8/1989 | Turner | B60K 15/03504 |
| | | | 123/519 |
| 4,907,616 A | 3/1990 | Bergsma | |
| 5,704,383 A | 1/1998 | Kammeraad | |
| 6,520,200 B1 | 2/2003 | Lawrukovich et al. | |
| 6,681,796 B2 | 1/2004 | King, Jr. | |
| 8,910,652 B2 | 12/2014 | Nemeth | |
| 2002/0121300 A1 | 9/2002 | Ehrman et al. | |
| 2008/0121834 A1 | 5/2008 | Kern | |
| 2009/0014090 A1 | 1/2009 | Roscher et al. | |
| 2015/0118076 A1 | 4/2015 | Grassbaugh | |
| 2015/0151631 A1 | 6/2015 | Vulkan et al. | |
| 2016/0297296 A1 * | 10/2016 | Vulkan | B60K 15/03504 |

FOREIGN PATENT DOCUMENTS

| | | |
|---|---|---|
| WO | WO 2012/104850 | 8/2012 |
| WO | 2013144960 | 10/2013 |
| WO | 2015087320 | 6/2015 |

\* cited by examiner

DRAINING ARRANGEMENT

TECHNOLOGICAL FIELD

The presently disclosed subject matter relates to a draining arrangement in general and in particular to a draining arrangement for draining liquid from a fluid pipe system.

BACKGROUND ART

References considered to be relevant as background to the presently disclosed subject matter are listed below:
US 2015151631
WO2015087320

Acknowledgement of the above references herein is not to be inferred as meaning that these are in any way relevant to the patentability of the presently disclosed subject matter.

BACKGROUND

In different industries and various types of equipment it is often required to drain fluid lines, whether liquid or gas pipes. One such example is the need to drain a fuel system of a vehicle.

Typically, a vehicle's fuel system includes, among others, fuel vapor accessories and tube segments which tend to accumulate fuel therein. Accumulation of fuel inside these parts, however, may cause a malfunction of the fuel vapor system, as the fuel path towards the fuel treating device is blocked and thus fuel vapor does not reach the fuel treating device. Accordingly, it is necessary to provide the fuel vapor system with a draining device to, particularly to portions of the fuel vapor system which tend to accumulate fuel therein.

US2015151631 discloses a roll over fuel-vapor valve is provided including a housing defining a valve having a valve inlet port extending through a wall of the housing and a valve outlet port and a float member disposed between said inlet port and said outlet port and being displaceable between an open position and a closed position said hosing further comprising a fluid flow channel extending along a top portion thereof and having a first end and a second end, wherein said outlet port extending into said channel such that in said open position fluid flow is facilitated between said valve inlet port and said channel.

WO2015087320 discloses a draining device for draining fuel from a fuel vapor system into a fuel tank is provided, the draining device comprising a port configured to be coupled to a fuel vapor accessory and a sealing member displaceable between a closed position in which the port is closed by the sealing member and an open position in which fuel from the fuel vapor accessory can be drained into the tank, wherein the sealing member is displaced into the open position when pressure in the tank is substantially equal to the atmospheric pressure and the fuel level in the tank is below the fuel level in the fuel vapor accessory.

GENERAL DESCRIPTION

According to the presently disclosed subject matter there is disclosed an external pipe draining arrangement configured for applying to a fluid pipe. The arrangement according to the disclosure being suitable for use any type of fluid pipe systems and is not restricted to any particular type.

There is provided, according to one aspect of the presently disclosed subject matter, a draining arrangement comprising a pipe segment having an aperture defined by circumferential wall portion and a draining tube having an insertion end configured to be introduced into the aperture and to engage the circumferential wall portion such that the circumferential wall portion is slightly bent inwardly, thereby sealingly engaging the insertion end. The insertion end includes a bore providing fluid communication between the pipe segment and the draining tube, and a cutaway configured to allow fluid from the pipe segment to enter the bore.

According to a further aspect of the presently disclosed subject matter there is provided a method for providing a draining arrangement, the method comprising forming an aperture in a pipe segment the aperture being defined by a circumferential wall portion, introducing an insertion end of a draining tube into the aperture such that the insertion end urges the circumferential wall portion to slightly bent inwardly sealingly engaging thereby the insertion end, and forming a cutaway in the insertion end configured to provide fluid communication between the inside of the pipe segment and the draining tube, such that fluid from the pipe segment can enter the draining tube.

According to yet a further aspect of the presently disclosed subject matter there is provided a draining tube having an insertion end configured to be introduced into an aperture formed in a pip segment and to engage a circumferential wall portion thereof such that the circumferential wall portion is slightly bent inwardly, thereby sealingly engaging the insertion end. The insertion end includes a bore configured to provide fluid communication between the pipe segment and the draining tube, and a cutaway configured to allow fluid from the pipe segment to enter the bore.

Any one or more of the following features designs and configurations can be applied with a draining system and method according to the present disclosure, independently or in various combinations:

- The draining tube can be coupled to a draining valve, and the insertion end can include an engagement portion for sealingly engaging the circumferential wall portion.
- The cutaway can be a slanted portion the circumference thereof gradually decreasing from a middle section of the insertion end towards a remote end thereof.
- The cutaway can be configured to allow fluid gravitating on the wall portion of the pipe segment to enter the bore.
- The ratio between the diameter of the aperture and that of the insertion end can be determined in accordance with the sealing requirements.
- The bending of the circumferential wall portion results in a ring-shaped fold formed about the engagement portion of the insertion end.
- The insertion end can be configured to extend inside the pipe segments and to protrude from the inner wall thereof such that the entire width of the ring-shaped fold bears on the engagement portion of the insertion end.
- The insertion end can include a shoulder portion configured with a diameter larger than that of the insertion end such that once the insertion end is disposed inside the aperture and the ring-shaped fold engages the insertion end, the shoulder portion abuts the edge of the ring-shaped fold.
- The insertion end can further include a tapered portion defined at the remote end thereof, and configured with a varying outer diameter increasingly changing towards the draining tube.
- The draining arrangement can be configured for draining liquid under gravity forces According to one particular example, the system disclosed herein can be configured for use in conjunction with a fuel system, e.g. a vehicle fuel system.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
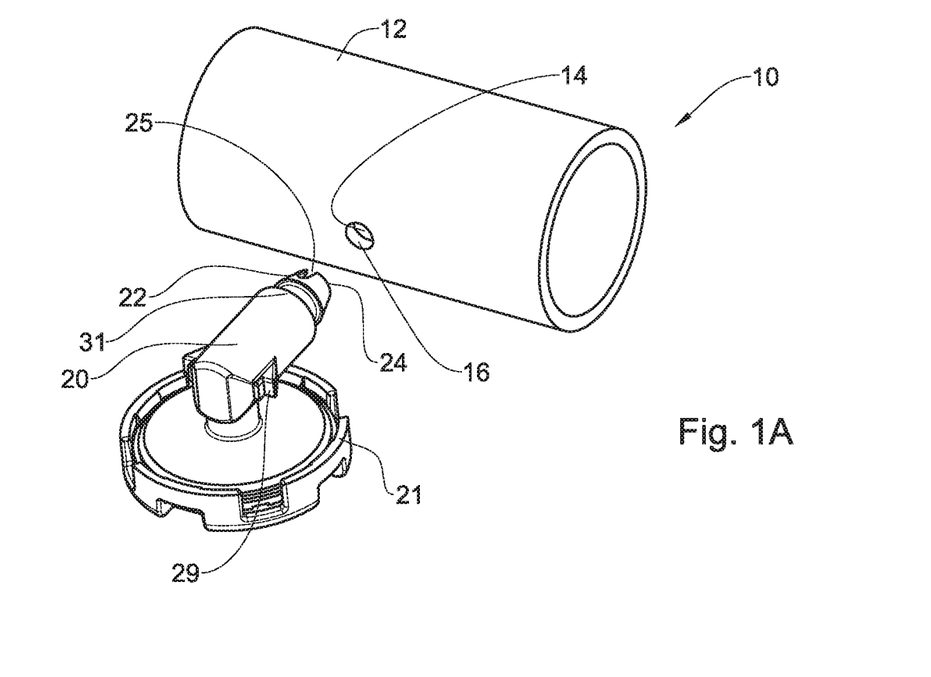
FIG. 1A is a perspective bottom view of a draining arrangement in accordance with an example of the presently disclosed subject matter, in unassembled position.
Figure 1B:
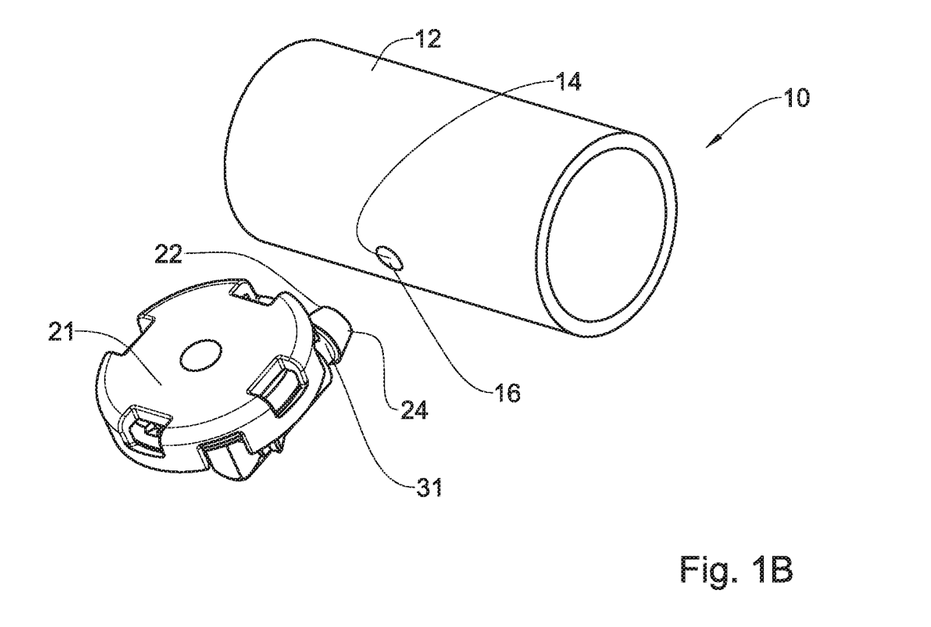
FIG. 1B is a perspective top view of a draining arrangement in accordance with an example of the presently disclosed subject matter, in unassembled position.
Figure 2A:
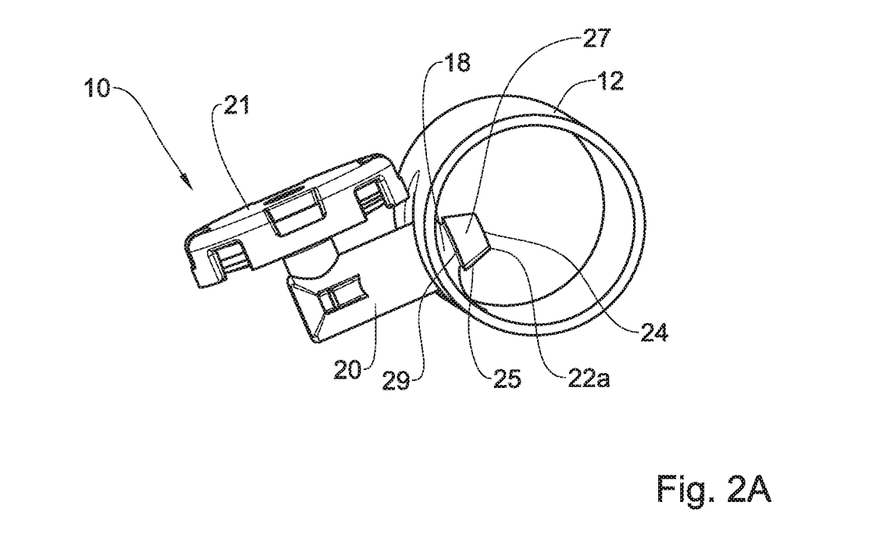
FIG. 2A is a side perspective view of the draining arrangement of FIG. 1, in an assembled position.
Figure 2B:
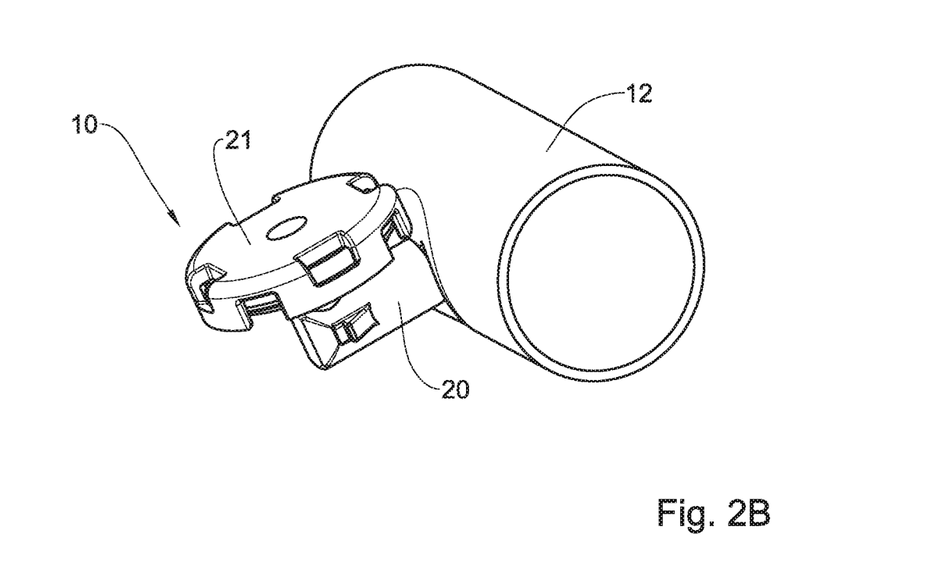
FIG. 2B is another side perspective view of the draining arrangement of FIG. 1.
Figure 3:
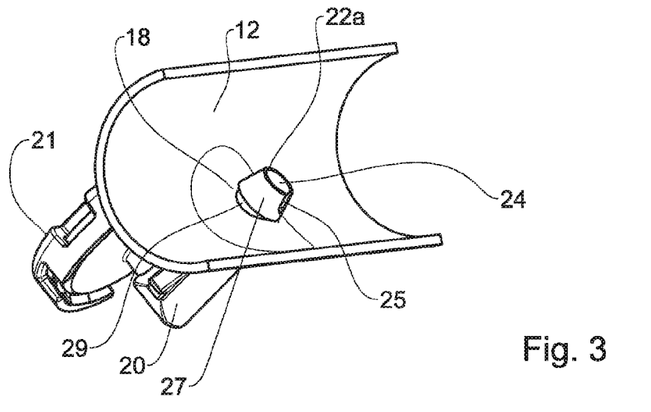
FIG. 3 is a sectional view of the pipe segment of the draining arrangement of FIG. 1.

FIGS. 1A and 1B are a perspective view of a draining arrangement 10 including a pipe segment 12 having an aperture 14 defined by circumferential wall portion 16, and a draining tube 20 having an insertion end 22 configured to be introduced into the aperture 14. The draining tube is coupled to a draining valve 21, for example such which is described in U.S. Provisional Patent Application No. 61/913,456.

The aperture 14, which according to the illustrated example is a circular aperture, includes a diameter, which is slightly smaller than that of the insertion end 22. The pipe segment 12 is made of a flexible material, which allows for sealing engagement therewith. In addition, the insertion end 22 can be made of material, which provides sealing engagement with the circumferential wall portion 16 of the aperture 14, when it is inserted therein.

Figure 4A:
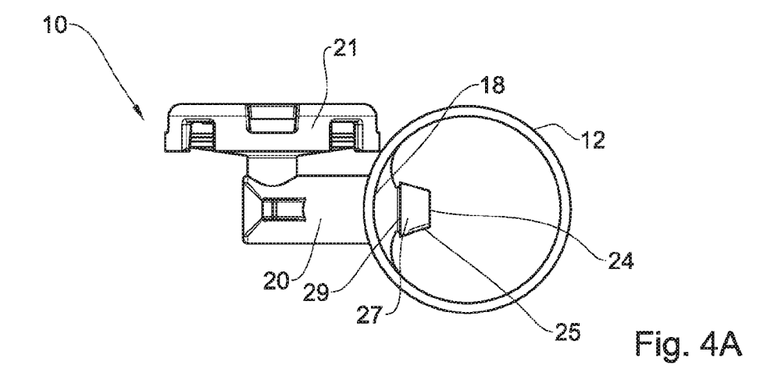
FIG. 4A is a side view of the pipe segment of the draining arrangement of FIG. 1.
Figure 4B:
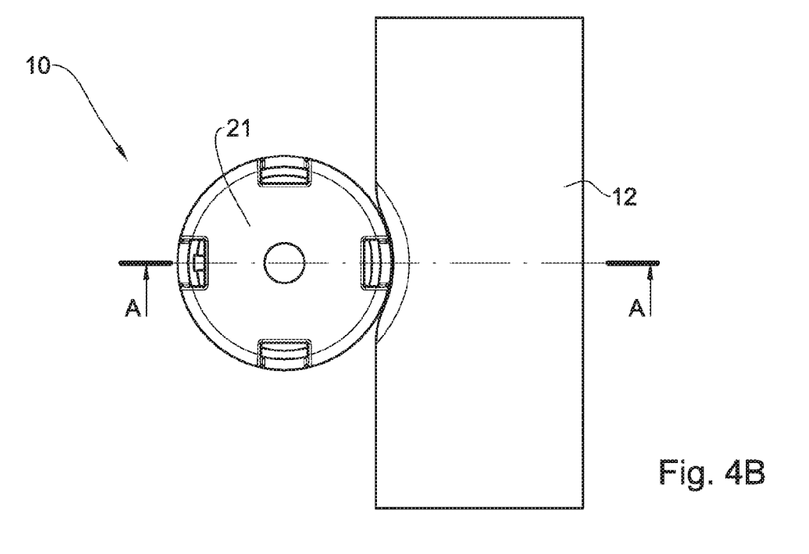
FIG. 4B is a top view of the pipe segment of the draining arrangement of FIG. 1.
Figure 4C:
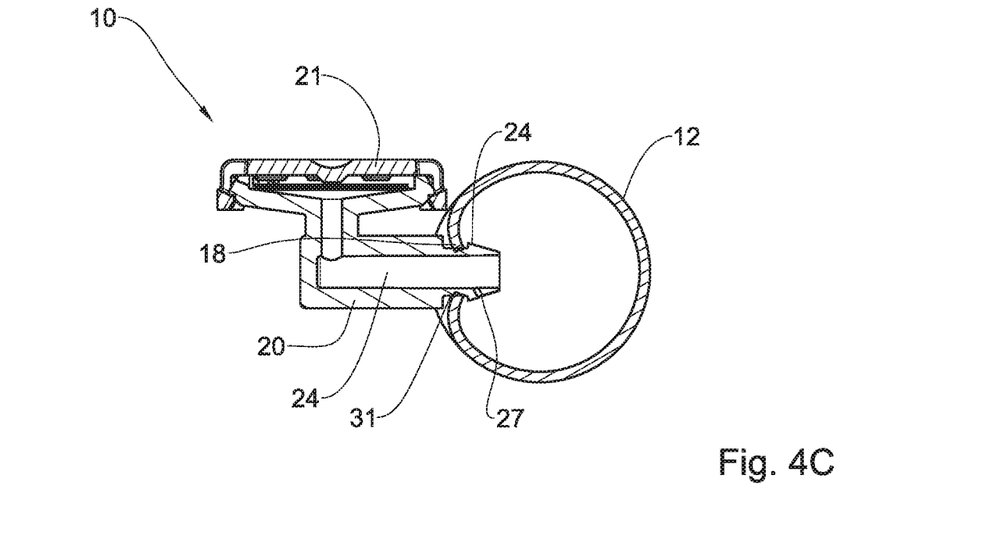
FIG. 4C is a side sectional view of the draining arrangement taken along line A-A of FIG. 4B.

Due to the slight difference between the diameters of the aperture and the insertion end 22, the insertion end 22 is further configured to engage the circumferential wall portion such that the circumferential wall portion 16 is slightly bent inwardly, thereby forming a ring-shaped fold 18 (shown in FIG. 4A) providing thereby further sealing engagement between the aperture 14 and the insertion end 22. It is noted that the insertion end 22, when disposed inside the aperture 14, protrudes inside the pipe segment 12, such that the ring-shaped fold 18 bears against the insertion end 22, providing thereby sealing engagements therewith.

It is appreciated that the width of the ring-shaped fold 18 formed by the wall portion 16 of the aperture 14 is determined by the difference between the diameter of the aperture 14 and that of the insertion end 22. That is to say, when the insertion end 22 is disposed inside the aperture 14 the latter is forced thereby to expand by inwardly bending the wall portion 16 to form a ring-shaped fold 18. The ring-shaped fold 18 can thus have a width which is configured for providing the required sealing between the pipe segment 12 and the insertion end 22. It is further noted, that the insertion end 22, according to some examples, can be configured to extend inside the pipe segments 12 and to protrude from the inner wall thereof such that the entire width of the ring-shaped fold 18 bears on the insertion end 22. That is to say that the insertion end 22 is configured with a length in accordance with the width of the ring-shaped fold 18.

It will be appreciated that the ratio between the diameter of the aperture 14 and that of the insertion end 22, can be determined in accordance with the sealing requirements. For example, in case the draining arrangement is utilized in a fuel vapor system, where materials are subjected to swelling and expansions, the ratio can be determined such that the expansion of the insertion end 22 and the expansion of the aperture 14 do not result in a leak. According to an example, the material of the pipe segment 12 has similar characteristics as that of insertion end 22, such that the effect of the fuel thereon is substantially similar The insertion end 22 further includes a bore 24 providing fluid communication between the pipe segment 12 and the draining tube 20, and a cutaway 25 configured to allow fluid gravitating on the wall portion of the pipe segment to enter the bore 24. In other words, since the insertion end 22 protrudes from the inner wall of the pipe segment 12, liquid droplets accumulating thereabout cannot be drained into the draining tube 20, until the liquid level exceeds the height of the protrusion of the insertion end 22. Thus, in order to allow any liquid entrainment in the pip segment 12 to be drained into the draining tube 20, the cutaway 25 is configured such that fluid communication is allowed between the bore 24 and the surrounding of the insertion end 22, even when the liquid level in the pip segment is lower than the height of the protrusion of the insertion end 22 inside the pipe segment 12.

It is appreciated that accordingly the cutaway 25 allows draining of liquid from the pipe segment 12 even when the pressure level therein is not higher than the pressure level inside the draining tube 20. That it to say, fluid inside the pipe segment 12 is not urged to drain into the draining tube 20 by the mere pressure inside the pipe segment 12, rather the fluid therein gravitates to the lowest point thereof. Accordingly, the pipe segment 12 can be disposed above the draining valve 21 and the draining tube 20, allowing thereby the fluid therein to gravitate into the draining tube 20. Thus, the cutaway 25 formed in the insertion end 22 provides a path for the fluid into the bore 24 of the draining tube 20.

According to the particular example shown in FIGS. 1 through 4C, the insertion end 22 further includes a tapered portion 27 defined at the remote end 22a thereof, and configured with a varying outer diameter increasingly changing towards the draining tube 20. The diameter at the remote end 22a, is smaller or the same as the diameter of the aperture 14 facilitating thereby the insertion of the insertion end 22 through the aperture 14, while the diameter increases towards the draining tube 20. Accordingly, as the insertion end 22 is further pushed through the aperture 14, the increasing diameter of the tapered portion 27 urges the circumferential wall portion 16 of the aperture 14 inwardly forming thereby the ring-shaped fold 18.

In the present example, the insertion end 22 further includes a shoulder portion 29 configured with a diameter larger than that of the insertion end 22, such that once the insertion end 22 is disposed inside the aperture 14 and the ring-shaped fold 18 engages the insertion end 22, the shoulder portion 29 abuts the edge of the ring-shaped fold 18. The shoulder portion 29 thus, serves as a stop member preventing displacement of the insertion end 22 out of the aperture 14.

According to the illustrated example the shoulder portion 29 is defined by the proximal end of the tapered portion 27 which includes a diameter larger than that of the insertion end 22. Accordingly, the insertion end 22 includes a tapered portion 27 having a remote end 22a configured with a diameter smaller or substantially the same as that of the aperture 14. The diameter increasingly changed towards the shoulder portion 29 where it is larger than the diameter of the aperture 14 and substantially the same as or larger than the diameter of the ring-shaped fold 18. The insertion end 22 further defines an engagement portion 31 (shown in FIG. 4C) defined between the shoulder portion 29 and the aperture 14 tapered portion 27, and configured to provides sealing engagement with the ring-shaped fold 18.

The cutaway 25 according to the present example is formed as a slit formed along the length of the tapered portion 27, extending between the remote end 22a and the shoulder portion 29.

Figure 4D:
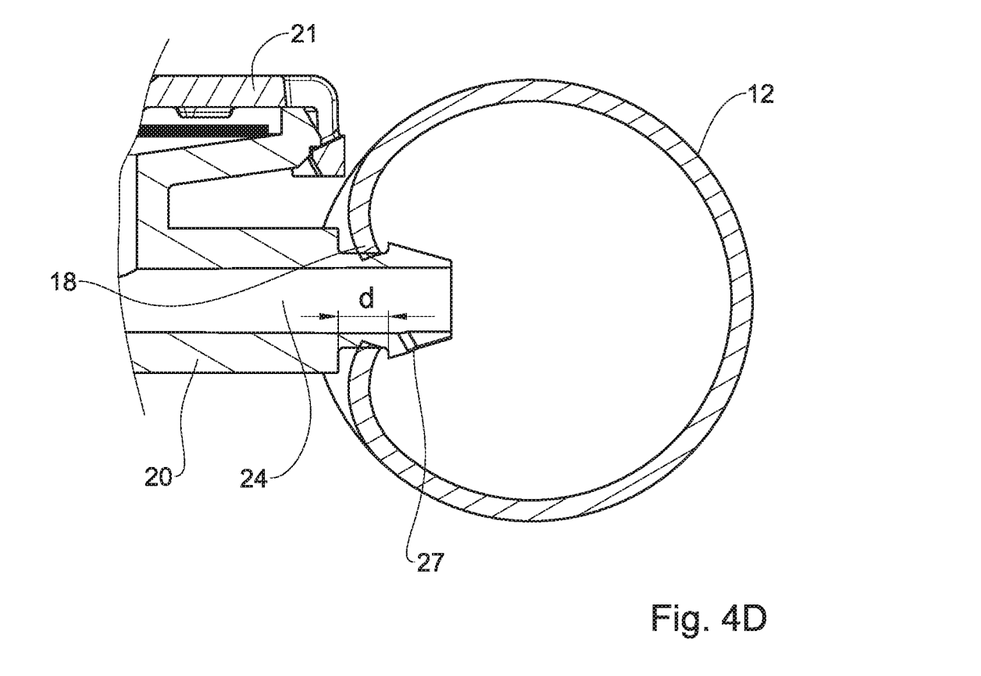
FIG. 4D is an enlarged view of the draining arrangement of FIG. 4C.

It is appreciated that the length of the engagement portion 31 (denoted in FIGS. 4C and 4D as d) is configured in accordance with the width of the ring-shaped fold 18, such that the ring-shaped fold 18 on one hand sealingly engages the engagement portion 31 and on the other hand abuts against the shoulder portion 29. This way, the insertion end 22 is securely held in place and provides a durable sealing engagement. It is appreciated that the shoulder portion 29 can be configured to provide further sealing engagement with the ring-shaped fold 18.

According to an example the draining arrangement 10 can be mounted inside a fuel tank, for example as part of the fuel vapor system. The pipe segment 12 can be a segment of a fuel accessory tube delivering fuel vapor towards a fuel vapor treating device, such as a canister. Any accumulating fuel liquid can be drained through the draining arrangement towards the fuel tank. Accordingly, since the pressure level in the fuel tank is likely to be higher than that in the fuel vapor system, i.e. the pipe segment, the pressure exerts forces on the insertion end 22 urging it further into the aperture 14. Thus, when insertion end 22 is further urged inside the aperture 14, the length of the engagement portion 31 residing inside the pipe segment 14 increases providing thereby more sealing engagement area for engaging the ring-shaped fold 18. When the pressure level inside the tank is equal to or lower than that in the pipe segment 12, draining of the fuel from the pipe segment is allowed.

It is appreciated that the pipe segment 14 can be made of material providing the required durability capable to maintain its characteristics in fuel conditions. At least the circumferential wall portion 16, is configured with flexibility allowing forming thereby the ring-shaped fold 18, and having sealing properties as required given the fuel tank conditions.

Figure 5:
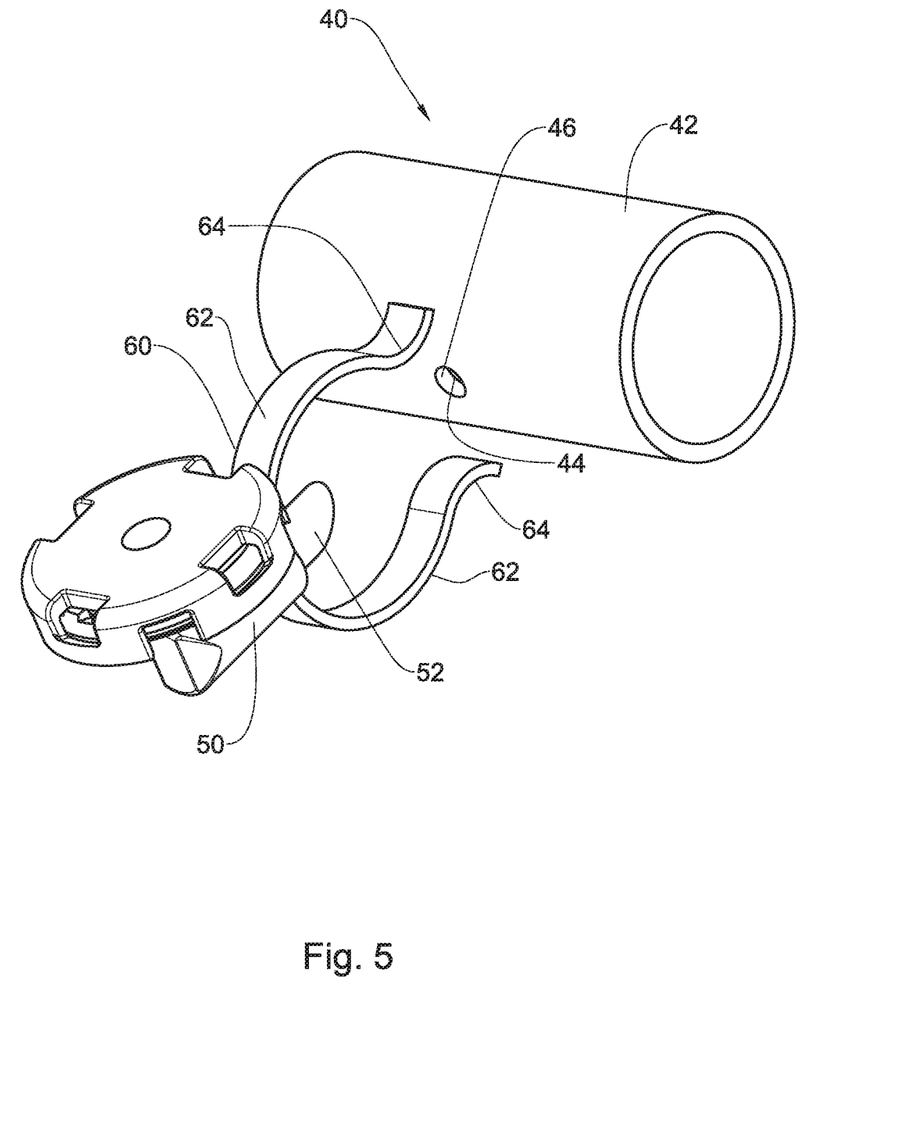
FIG. 5 is a perspective view of a draining arrangement in accordance with another example of the presently disclosed subject matter, in unassembled position.

Reference is now made to FIG. 5, the draining arrangement 40 according to another example, includes a pipe segment 42 having an aperture 44 defined by circumferential wall portion 46, and a draining tube 50 having an insertion end 52 configured to be introduced into the aperture 44.

The diameter of the insertion end 52 is slightly larger than that of the aperture 44, such that when the insertion end 52 is pushed through the aperture 44, the circumferential wall portion 46 is bent forming thereby a ring-shaped fold 48, substantially the same as described in the previous example. The insertion end 52 is configured to protrude inside the pipe segment 42 such that the ring-shaped fold 48 sealingly engages the insertion end 52.

The insertion end 52 further includes a bore 54 for providing fluid communication between the pipe segment and the draining tube 50. According to the present example the cutaway is formed as a slanted portion 55 formed at the remote end 52a of the insertion end 52. The slanted portion 55 includes a narrow portion, formed as a cutaway in the circumference of the insertion end 52, gradually increasing from a middle section of the insertion end 52 towards the remote end 52a thereof, such that at the middle portion of the insertion end 52 it includes a full circumference and at the remote end 52a the insertion end 52 terminates in a small section of the circumference thereof.

The slanted portion 55 thus provides path allowing fluid communication between the surroundings of the insertion end 52 and the bore 54. The slanted portion 55 further facilitates insertion of the insertion end 52 through the aperture 44, such that the remote end 52a can be easily inserted through the aperture 44. As the insertion end 52 is pushed forwards, sections of the slanted portion 55 having a larger circumference engage the wall portion 46 until the entire outer wall thereof engages the circumferential wall portion 46 of the aperture 44, urging thereby folding thereof inwardly and forming thereby the ring-shaped fold 48.

Figure 6A:
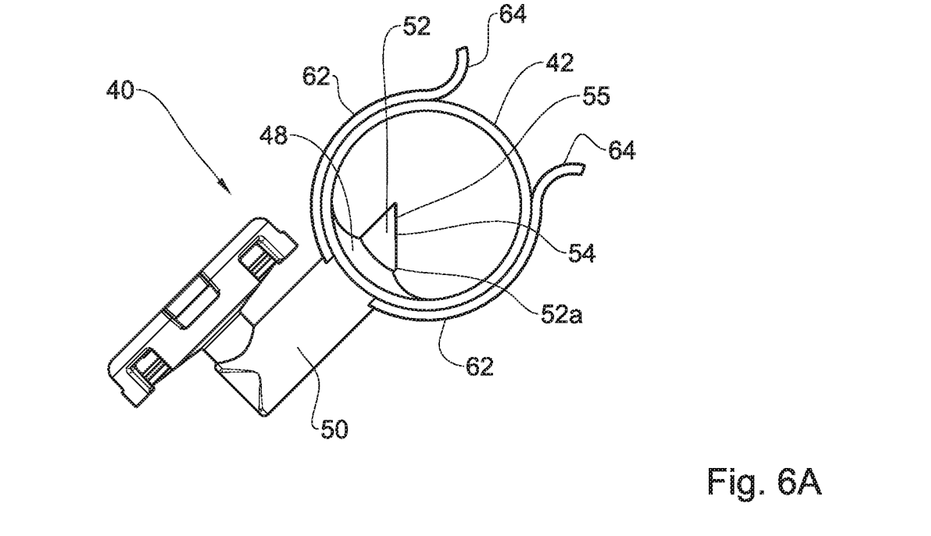
FIG. 6A is a side view of the pipe segment of the draining arrangement of FIG. 5 in an assembled position.
Figure 6B:
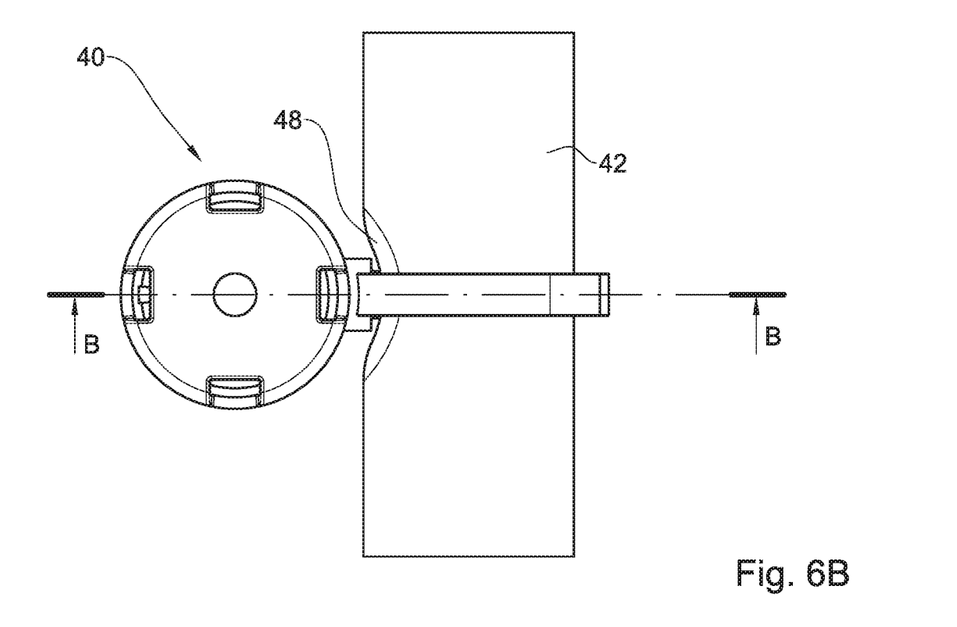
FIG. 6B is a top view of the pipe segment of the draining arrangement of FIG. 5.
Figure 6C:
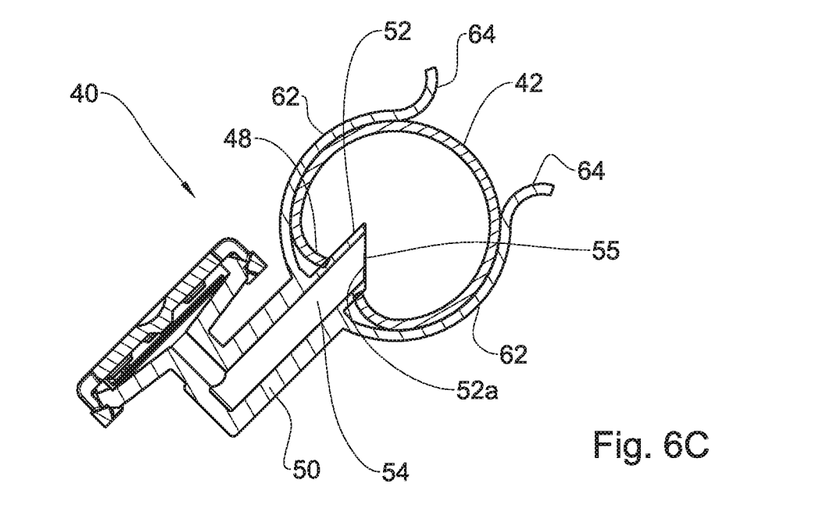
FIG. 6C is a side sectional view of the draining arrangement taken along line B-B of FIG. 6B.
Figure 6D:
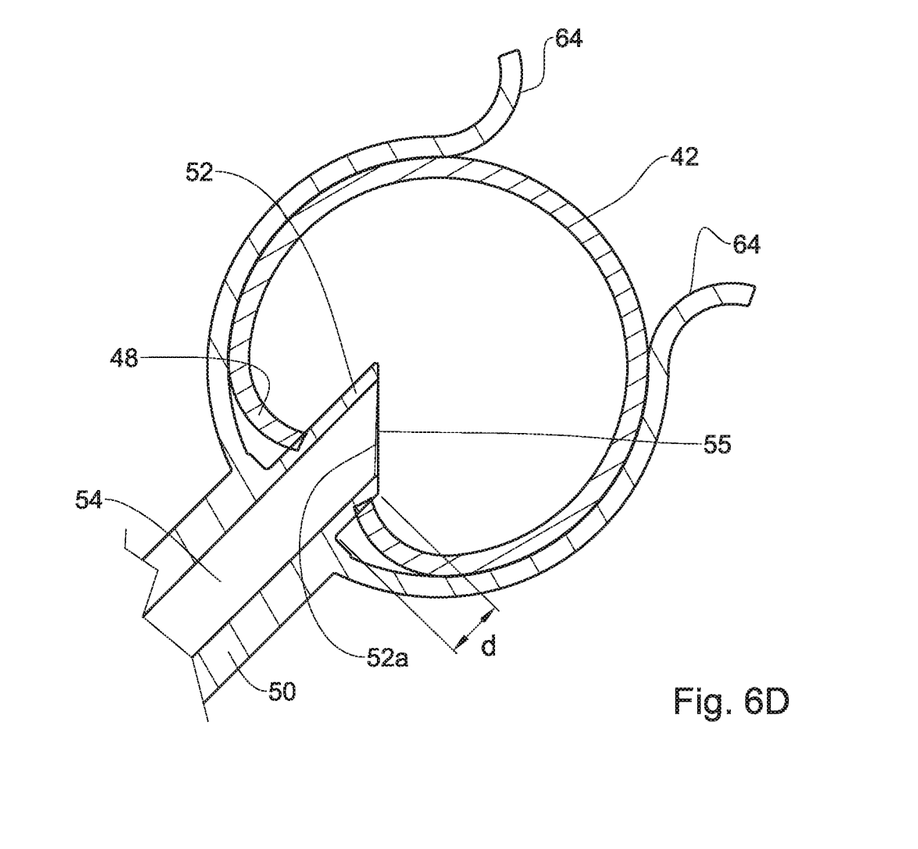
FIG. 6D is an enlarged view of the draining arrangement of FIG. 6C.

The insertion end 52 defines and engagement portion 61 below the slanted portion 55, (denoted in FIG. 6D as d) the length of which is configured in accordance with the width of the ring-shaped fold 48, such that the ring-shaped fold 48 sealingly engages the engagement portion 61. The length d can thus be configured in accordance with the sealing requirements, and the expansion properties of the ring-shaped fold 48.

According to this example, the draining arrangement 40 further includes a snap clip member 60 mounted on the draining tube 50 and having two circular arms 62 configured with a radius similar to that of the outer wall of the pipe segment 42, such that it can securely engage the pip segment 42 facilitating maintaining the insertion end 52 secured in the aperture 44. The circular arms 62 can be slightly flexible and can each include an outwardly extension 64, configured to allow pushing the circumference pipe segment 42 therebetween until it securely held in place between the circular arms 62.

Those skilled in the art to which the presently disclosed subject matter pertains will readily appreciate that numerous changes, variations, and modifications can be made without departing from the scope of the invention, mutatis mutandis.

The invention claimed is:
1. A draining arrangement, comprising:
a pipe segment having an aperture defined by circumferential wall portion; and
a draining tube having an insertion end configured to be introduced into the aperture and to engage the circumferential wall portion such that the circumferential wall portion is slightly bent inwardly, thereby sealingly engaging the insertion end;

a snap clip member mounted to the draining tube for securely engaging an outer wall of the pipe segment to facilitate maintaining the insertion end secured in the aperture;

wherein the insertion end includes a bore providing fluid communication between the pipe segment and the draining tube, and a cutaway configured to allow fluid from the pipe segment to enter the bore.

2. The draining arrangement according to claim 1, wherein the draining tube is coupled to a draining valve, and wherein the insertion end includes an engagement portion for sealingly engaging the circumferential wall portion.

3. The draining arrangement according to claim 1, wherein the cutaway is a slanted portion with a circumference thereof gradually decreasing from a middle section of the insertion end towards a remote end thereof.

4. The draining arrangement according to claim 1, wherein the cutaway is configured to allow fluid gravitating on the circumferential wall portion of the pipe segment to enter the bore.

5. The draining arrangement according to claim 1, wherein a ratio between a diameter of the aperture and that of the insertion end is determined in accordance with the sealing requirements.

6. The draining arrangement according to claim 1, wherein bending of the circumferential wall portion results in a ring-shaped fold formed about an engagement portion of the insertion end configured for sealingly engaging the circumferential wall portion.

7. The draining arrangement according to claim 6, wherein the insertion end is configured to extend inside the pipe segments and to protrude from an inner wall thereof such that an entire width of the ring-shaped fold bears on the engagement portion of the insertion end.

8. The draining arrangement according to claim 6, wherein the insertion end includes a shoulder portion configured with a diameter larger than that of the insertion end such that once the insertion end is disposed inside the aperture and the ring-shaped fold engages the insertion end, the shoulder portion abuts the edge of the ring-shaped fold.

9. The draining arrangement according to claim 1, wherein the insertion end includes a tapered portion defined at a remote end thereof, and configured with a varying outer diameter increasingly changing towards the draining tube.

10. The draining arrangement according to claim 1, wherein the draining arrangement is configured for draining liquid under gravity forces.

11. The draining arrangement according to claim 1, configured for use in conjunction with a vehicle fuel system.

12. The draining arrangement according to claim 1, wherein the snap clip member includes two circular arms configured with a radius similar to a radius of the outer wall of the pipe segment.

13. The draining arrangement according to claim 1, wherein the insertion end is in the form of a cylindrical tube having an outer cylindrical wall and a slanted portion, wherein the outer cylindrical wall extends from the slanted portion to an outside of the aperture when the insertion end is introduced into the aperture and engaged to the circumferential wall portion.

14. A method for providing a draining arrangement, the method comprising:
forming an aperture in a pipe segment, wherein the aperture is defined by a circumferential wall portion;
introducing an insertion end of a draining tube into the aperture such that the insertion end urges the circumferential wall portion to slightly bent inwardly, thereby sealingly engaging the insertion end; wherein the draining tube includes a snap clip member mounted to the draining tube;
securely engaging the snap clip member to an outer wall of the pipe segment to facilitate maintaining the insertion end secured in the aperture; and
forming a cutaway in the insertion end, wherein the cutaway is configured to provide fluid communication between an inside of the pipe segment and the draining tube, such that fluid from the pipe segment can enter the draining tube.

15. The method according to claim 14, wherein the draining tube is coupled to a draining valve, and wherein the insertion end includes an engagement portion for sealingly engaging the circumferential wall portion.

16. The method according to claim 14, wherein the cutaway is a slanted portion with a circumference thereof gradually decreasing from a middle section of the insertion end towards a remote end thereof.

17. The method according to claim 14, wherein the cutaway is configured to allow fluid gravitating on the wall portion of the pipe segment to enter the bore.

18. The method according to claim 14, wherein a ratio between a diameter of the aperture and that of the insertion end is determined in accordance with the sealing requirements.

19. The method according to claim 14, wherein bending of the circumferential wall portion results in a ring-shaped fold formed about the engagement portion of the insertion end.

20. The method according to claim 19, wherein the insertion end is configured to extend inside the pipe segments and to protrude from an inner wall thereof such that an entire width of the ring-shaped fold bears on the engagement portion of the insertion end.

21. The method according to claim 19, wherein the insertion end includes a shoulder portion configured with a diameter larger than that of the insertion end such that once the insertion end is disposed inside the aperture and the ring-shaped fold engages the insertion end, the shoulder portion abuts the edge of the ring-shaped fold.

22. The method according to claim 14, wherein the insertion end includes a tapered portion defined at a remote end thereof, and configured with a varying outer diameter increasingly changing towards the draining tube.

23. The method according to claim 14, wherein the draining arrangement is configured for draining liquid under gravity forces.

24. The method according to claim 14, configured for use in conjunction with a vehicle fuel system.

* * * * *